United States Patent [19]

Teller

[11] 3,969,482

[45] July 13, 1976

[54] ABATEMENT OF HIGH CONCENTRATIONS OF ACID GAS EMISSIONS

[75] Inventor: Aaron Joseph Teller, Westboro, Mass.

[73] Assignee: Teller Environmental Systems, Inc., Worcester, Mass.

[22] Filed: Apr. 25, 1974

[21] Appl. No.: 463,651

[52] U.S. Cl. .............................. 423/235; 423/239; 423/240; 423/242; 423/244; 423/215.5; 55/71; 55/73
[51] Int. Cl.² ......................................... B01D 53/34
[58] Field of Search .......... 423/210, 220, 244, 240, 423/241, 242, 235, 239, 234, 215.5; 55/73, 90, 71

[56] References Cited
UNITED STATES PATENTS

| | | | |
|---|---|---|---|
| 2,231,309 | 2/1941 | Weber | 423/241 |
| 2,813,000 | 11/1957 | Quittenton | 423/242 |
| 3,324,630 | 6/1967 | Teller et al. | 55/90 |
| 3,808,774 | 5/1974 | Teller | 55/73 |
| 3,851,042 | 11/1974 | Minnick | 423/244 |

*Primary Examiner*—Earl C. Thomas
*Attorney, Agent, or Firm*—Thompson, Birch, Gauthier & Samuels

[57] ABSTRACT

A process is disclosed for the large-scale abatement of acid gases in hot industrial effluent gas streams. In a first stage, the proportion of acid gases in a hot gas stream containing a relatively high initial concentration of acid gases is substantially reduced by contacting the gas stream with an aqueous solution or slurry of a basic material capable of reacting with the acid gases under such conditions that a dry salt is left as the reaction product. In subsequent steps, particulate material and residual acid gases are removed from the gas stream either: 1) by introducing into the gas stream a particulate material capable of sorbing acid gases followed by a particulate removal step; or, 2) by using a wet scrubber.

16 Claims, 3 Drawing Figures

Fig. 2.

ABATEMENT OF HIGH CONCENTRATIONS OF ACID GAS EMISSIONS

BACKGROUND OF INVENTION

The problems of emitting to the atmosphere industrial gases containing a high proportion of noxious substances have long been recognized. Acid gases such as the sulfur oxides, nitrogen oxides and the hydrogen halides are particularly common and undesirable components of industrial effluent gases. Bled to the atmosphere, such gases condense on water droplets forming strong acids and, blown about by wind, such droplets cause severe corrosion of metal parts and machinery even many miles from the industrial site. The direct danger to animal and vegetable life in such areas has been established. As a result, local ordinances and national regulations in the United States and various other countries have set increasingly strict limits on the permissible acid gas-content of effluent gases. A variety of methods have been proposed for dealing with this situation, but none has so far been wholly successful in dealing with the tri-partite problem of handling large volumes of hot effluent gas containing comparatively high concentrations of acid gases, reducing acid gas content to an acceptable level, and still maintaining an economical operation.

FIELD OF INVENTION

The present invention is directed to a novel process for abating substantially all of the acid gases in an effluent gas stream containing a relatively high initial concentraion of acid gases by quenching the gas stream with an aqueous solution of slurry of a basic material. In essence, the basic material reacts with the acid gases to form a salt under such conditions that the salt is left as a dry reaction product. The salt may be recovered and sold as a by-product, and the gas stream may be further treated for the removal of residual acid gases and particulates.

DESCRIPTION OF PRIOR ART

It has long been known to purify gas streams through contact with a solid sorbent material capable of selectively reacting with and/or physically sorbing the impurities from the gas stream. For example, in U.S. Pat. No. 853,559, moisture and other impurities such as carbonic acid ($CO_2$) are removed from air by disseminating powdered lime (CaO) in the gas stream. U.S. Pat. No. 1,221,505 teaches the addition of a cloud of suspended hydrated lime [$Ca(OH)_2$] to remove "chlorin" ($Cl_2$) from a gas stream. U.S. Pat. Nos. 1,577,534 and 1,957,251 disclose other variaions of the same process. U.S. Pat. No. 2,378,155 teaches methods of treating sorbent alumina in order to modify its "sorptive" characteristics. Sorptive materials were commonly employed in the form of filter cakes or beds of granular material as taught by U.S. Pat. Nos. 2,391,116; 2,526,776; and 3,197,942. However, many problems were associated with such methods. Packed sorption towers of the types heretofore employed were restricted in their use to the treatment of relatively small volumes of gaseous material. Larger volumes could not be efficiently processed through fixed bed towers because of the large pressure drop that occurs across the packing. The need for large amounts of power to force the gas through the beds made such processes uneconomical when the contaminant gas was present in concentrations below about 400 parts per million. Moreover, fixed bed towers experienced the problems of having "break-through" point, that is, the bed of sorbent material would gradually become saturated until, at a particular point, the level of efficiency would rapidly fall off. At this stage, a break-through of contaminants would occur and pollutants would escape until the system was either shut down and changed or the gas stream directed to a freshly-packed tower. This was, quite simply, a batch operation. The serious problems of pressure drops, break-through points and discontinuous operations were found to exist in fluidized bed operations, such as that shown by U.S. Pat. No. 3,723,598, where the granular sorptive materials in a bed are agitated by the entering contaminated gas stream so that the aerated mass has a tendency to behave more as a fluid.

U.S. Pat. No. 2,919,174 discloses a process for removing fluoride contaminants from gas streams which avoids the high pressure drops and break-through points of certain of the prior art processes described above. This process consists of dispersing finely divided calcium carbonate ($CaCO_3$) or other basic salts of alkaline or alkaline earth metals in the gas stream containing fluoride contaminants and directing the particle-laden stream into a baghouse filter where a permeable layer of the alkaline material is allowed to build up. However, this process is deficient in other aspects in that it is limited to alkaline substances which will react with fluoride gases in the dry state. Furthermore, this process requires that a layer of the alkaline material be built up on theinside of the filter surface before it can become effective.

"Wet processes" are known in the prior art in which a tower is filled with a packing material and a liquid, such as water, through which a contaminated gas stream is passed. Wet washing of waste gases with aqueous solutions or slurries of manganese sulfate, calcium bicarbonate, lime, ammonia and sodium sulfite-bisulfite to remove sulfur dioxide wa discounted in U.S. Pat. No. 3,551,093 as impractical because of the necessity of cooling the flue gas to below 100°C. (the boiling point of water) before sorption would take place. Furthermore, the high pressure drop across the packed tower and comparatively slow rate of diffusion of the gas through the liquid phase make this process impractical for large-scale operations.

Other recent but still not wholly satisfactory processes for treating gas streams include U.S. Pat. No. 3,505,008 for a one-step process of removing fly ash and sulfur dioxide from flue gases and East German Pat. No. 60,996 for a process of sorbing acid gases using a porous glass.

SUMMARY OF INVENTION

The foregoing problems are obviated by the present invention, a general object of which is the provision of a novel and improved process for abating acid gases in high volume industrial effluent gas streams containing a relatively high initial concentration of acid gases.

Another object of the present invention is to provide a process for the large-scale abatement of acid gases which is characterized by comparatively low energy requirements and an adaptability to substantially continuous operations.

A further object of the present invention is the provision of a process for the large-scale abatement of acid gases which includes recovery of a useful and valuable by-product.

A still further object of the present invention is the provision of an economical process for removing substantially all of the acid gases from an industrial effluent gas stream as the first step in an integrated process for removing acid gases and particulates from the gas stream.

Further objects and advantages of the present invention will become more apparent as the description proceeds with the aid of the following drawings.

DESCRIPTION OF THE PREFERRED EMBODIMENT

Figures 1, 3:
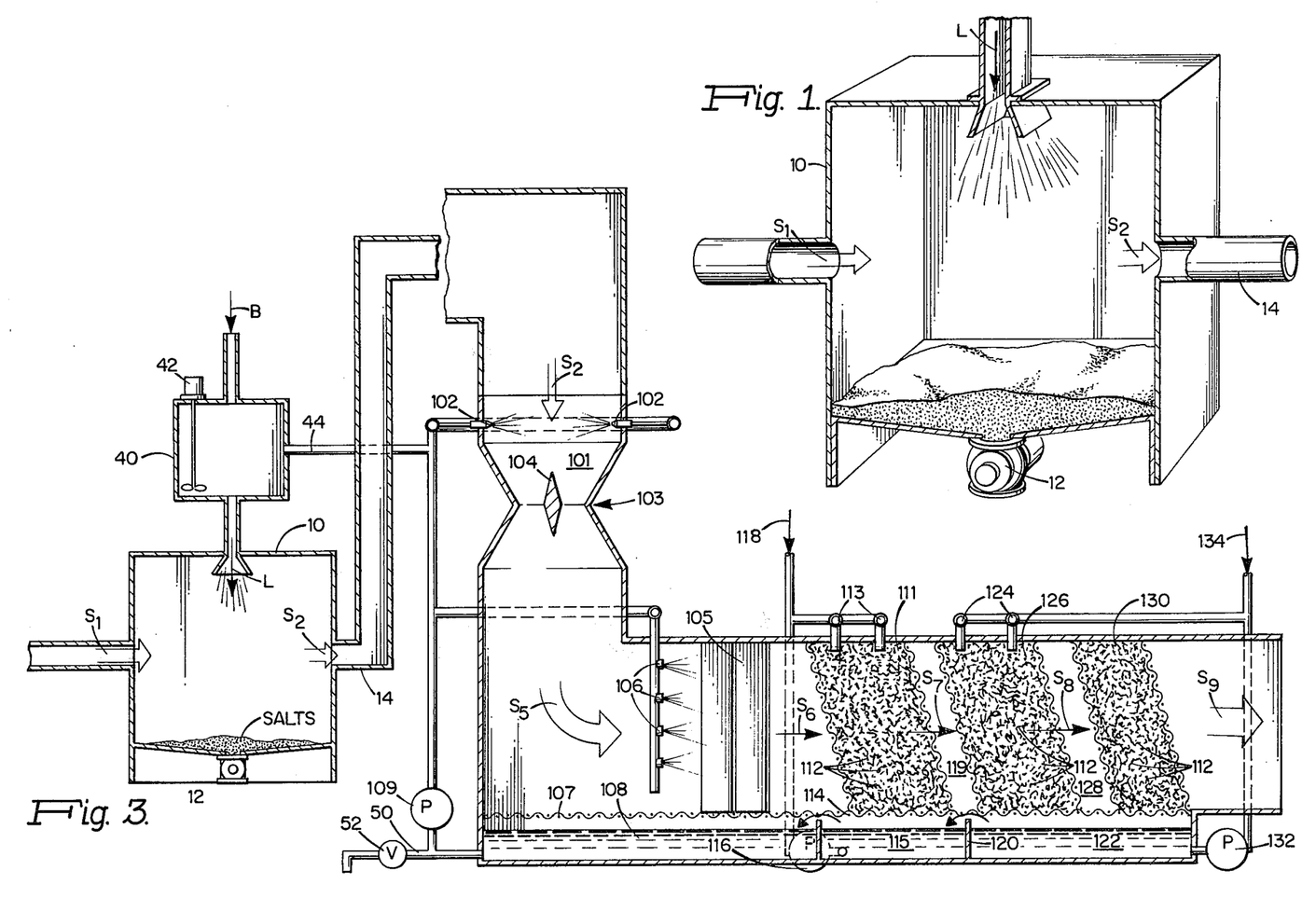
FIG. 1 is a partially-cutaway perspective view of the reaction chamber according to the present invention.
FIG. 3 is a flow diagram of an integrated treatment process employing a wet scrubber.

Referring more particularly to the drawings by characters of reference, FIG. 1 illustrates the reaction chamber of the present invention wherein the first stage removal of acid gases is accomplished. $S_1$ represents the contaminated effluent gas coming from a furnace, smelter or the like. The temperature of the gas may range from room temperatures to 3000°F. or higher, although typically the temperature ranges from 350°F. to 1000°F. The flow rates may vary from as little as 1 cc./min. to more than 1 million cfm. and is limited only by the size and design of the reaction chamber. The gaseous contaminants will vary depending on the particular industrial operation. For example, aluminum and secondary aluminum operations generate large volumes of hydrogen fluoride and silicon tetrafluoride. Coking operations produce quantities of sulfur dioxide and lesser amounts of the nitrogen oxides. Hydrogen chloride is another by-product in the secondary aluminum process as well as in the demagging of primary aluminum and in the incineration of waste chlorinated hydrocarbons.

The gas stream will typically also contain entrained particulates which may consist of dust, uncombusted carbon, various metallic oxides such as silica, alumina, ferrites, etc. In refinery operations, entrained droplets of liquid hydrocarbons and derivatives may also be found in the effluent gas stream.

The gas stream $S_1$ is directd into reaction chamber 10 where it comes into contact with a solution or slurry L, of a basic material, that is, a compound or substance which has a basic reaction in water. The most common materials of this type ar the alkali and alkaline earth metal oxides, hydroxides, carbonates and bicarbonates, but the invention is not limited to these. Specifically included within the scope of this invention are: $NaOH$, $Na_2CO_3$, $NaHCO_3$, $Na_2SO_3$; $KOH$, $K_2CO_3$, $KHCO_3$, $K_2SO_3$; $LiOH$, $Li_2CO_3$, $LiHCO_3$; $Ca(OH)_2$, $CaO$, $CaCO_3$; $Mg(OH)_2$, $MgO$, $MgCO_3$; $Ba(OH)_2$, $BaO$, $BaCO_3$; $Zn(OH)_2$, $ZnO$, $ZnCO_3$; $Ni(OH)_2$, $NiO$, $NiCO_3$; $Cu(OH)_2$, $CuOH$; $Fe(OH)_3$, $Fe_2O_3$, $FeCO_3$, $Fe_2(CO_3)_3$. Also included in this invention are the various ores which may comprise one or more of the above compounds and have a basic reaction in water. Exemplary of such ores are nepheline syenite and phonolite.

All of the above-mentioned alkali metal compounds, those of sodium, potassium and lithium, ar very soluble in water and may be employed as an aqueous solution. The other basic compounds listed above range from sparingly soluble in cold water to virtually insoluble. These compounds may be employed in finely-divided form as aqueous slurries. Although the solutions and slurries are typically employed at or about room temperature, in the case of a basic material of boarderline solubility, it may be desirable to employ a heated solution to keep the material in solution and thereby avoid the clogging problems which frequently accompany the use of slurries. In instances where the gas temperature is below about 250°F., particulary where the temperature is below the boiling point of water, it is desirable to superheat the solution or slurry. For example, by heating under pressure, the liquid temperature can be raised to about 1000°F. to insure there is adequate heat in the reaction chamber to completely and instantaneously vaporize all of the liquid and to leave a dry salt reaction product. However, it is preferred, and in most industrial operations it will be the case, that the heat supplied by the gas stream itself be adequate. Therefore, for convenience in this description of the invention, the gas stream will be referred to as a hot gas stream. Although the solution of slurry L is shown in FIG. 1 as being introduced at the top of reaction chamber 10, it will be appreciated that the solution or slurry can be added by any suitable means, such as one or more spray nozzles, positioned at a plurality of locations along the top and sides of the chamber to obtain a better distribution of the liquid.

Upon contact between the hot gas stream and the aqueous solution or slurry, a somewhat violent reaction occurs. The water is vaporized cooling the gas stream, causing great turbulence and facilitating intimate contact between the acid gases and the basic material. The latter leads to an almost complete chemical reaction with the formation of the corresponding acid salts. Under the described conditions the reaction is quite rapid and the necessary residence time of the gas in the reactor ranges from about one millisecond to not more than 3 seconds.

For example, if a lime slurry is used to quench a gas stream containing hydrogen chloride, the product will be the salt calcium chloride ($CaCl_2$). The concentration of the basic material in the aqueous solution or slurry and the relative proportion of hot effluent gas to solution or slurry are variables which can be adjusted so as to insure that: 1) there is a stoichiometric equivalent or excess of basic material in the reaction chamber at any given time; and, 2) for all of the water is vaporized to leave a dry salt product. For example, for a given flow rate of effluent gas having a given concentration of acid gases, one can calculate by conventional means the necessary rate of addition of basic material to provide a stoichiometric equivalent or excess. Based on the flow rate and temperature of the effluent gas, one can also compute the volume of water or aqueous solution which can be heated and vaporized by the gas stream. Leaving a certain margin of error to account for inefficient thermal contact, a suitable liquid flow rate may be chosen. The concentration of basic material in the solution or slurry necessary to provide the previously calculated rate of addition of basic material is then determined. If the liquid flow rate is increased, not to exceed the rate at which the liquid can be heated and completely vaporized, the concentration of basic material can be correspondingly decreased.

The preponderance of the salt particles thus formed in the reaction chamber are relatively large and fall to the bottom by action of gravity. There they can be allowed to accumulate for periodic removal. In the preferred embodiment, however, the dry salt particles are continuously removed from the reaction chamber 10 by suitable means 12 positioned at the bottom of the chamber. One such device is a rotary valve system such as that manufactured by Prater Industries, Inc. of Chicago, Illinois. Some of the fine salt particles formed in the reaction chamber become entrained in the exit gas stream $S_2$ from which they are subsequently removed by means described hereinafter.

Depending upon the nature of the acid gas contaminants, the basic material may be selected either purely from the standpoint of availability and economy or with a view toward forming a particularly desirable salt by-product. Thus, for example, when the acid gases consist predominantly of hydrogen chloride and lime is readily available, dry calcium chloride can be formed as the by-product and sold for use as road salt and similar deicing applications. Alternatively, where the acid gases consist of the more valuable fluorides, for example, it may be desirable to employ a more expensive basic material to obtain a by-product which has specialized applications and can therefore, command a higher price than general road salt. In some cases it is possible to select the basic material so that both the basic material and the acid gases can be easily regenerated from the dry salt. For example, if a slurry of magnesium oxide or magnesium carbonate is used to quench a gas stream containing sulfur dioxide, the magnesium sulfite formed can be decomposed and recovered as magnesium oxide and sulfur dioxide by conventional thermal treatment. The magnesium oxide can then be recycled as the basic material for the slurry.

On leaving the reaction chamber, the gas stream $S_2$ is typically at a temperature of about 100°–250°F. and is substantially free of acid gases. In general it has been found that with gas streams initially containing on the order of 1000–10,000 parts per million of acid gases, the quenching process according to the present invention is effective in abating about 60–95% of the acid gas emissions. In many applications, this step may be the only treatment needed to reduce acid gases to an acceptable level and it may be combined with subsequent conventional processes for the removal of particulates before emission of the gas to the atmosphere as shown in the examples below.

EXAMPLE 1

Gas at 900°F. at rate of 10,000 scfm. containing 4000 ppm. HCl is sprayed with a 2% aqueous slurry of Ca(OH)$_2$ at the rate of 24 gpm. which provides approximately a stoichiometric equivalent of basic material.

The effluent gas after contact with the slurry leaves the reaction chamber at 250°F. and contains 300 ppm. HCl. The solids are separated from the gas stream by conventional means such as cyclones, solid bed impactors or baghouses. The Ca(OH)$_2$ is converted during this process to a solid mixture of CaCl$_2$ and Ca(OH)$_2$ with 92.5% of the calcium appearing as CaCl$_2$.

EXAMPLE 2

Gas at 900°F. at rate of 10,000 scfm. containing 3000 ppm. SO$_2$ is contacted with a 3% aqueous slurry of MgCO$_3$ at the rate of 26.8 gpm. which provides approximately a stoichiometric equivalent of basic material.

The effluent gas, after contact with the slurry leaves the reaction chamber at 240°F. and contains 200 ppm. SO$_2$. The solids are separated from the gas stream by conventional means such as cyclones, solid bed impactors or baghouses. The MgSO$_3$ is converted to a solid mixture of MgSO$_3$, MgO and MgCO$_3$ with about 93% of the magnesium appearing as MgSO$_3$. The MgSO$_3$ is treated to regenerate SO$_2$ and MgO by heating it to above its decomposition point. The SO$_2$ is driven off as a gas and recovered by conventional processes. The solid mixture of MgO and MgCO$_3$ is recycled as basic material for the slurry.

However, with increasingly stringent regulations, it will generally be necessary to further reduce the level of acid gases in the effluent in addition to removing particulates. It is also often desirable to reduce the moisture content of the gas stream prior to mechanical filtration or exhausting the gas to the atmosphere since the combination of water vapor and residual acid gases is highly corrosive. These and other objectives are attained by combining the process carried out in reaction chamber 10 with one or more subsequent stages or processes described below.

SORPTION PROCESS

Figure 2:
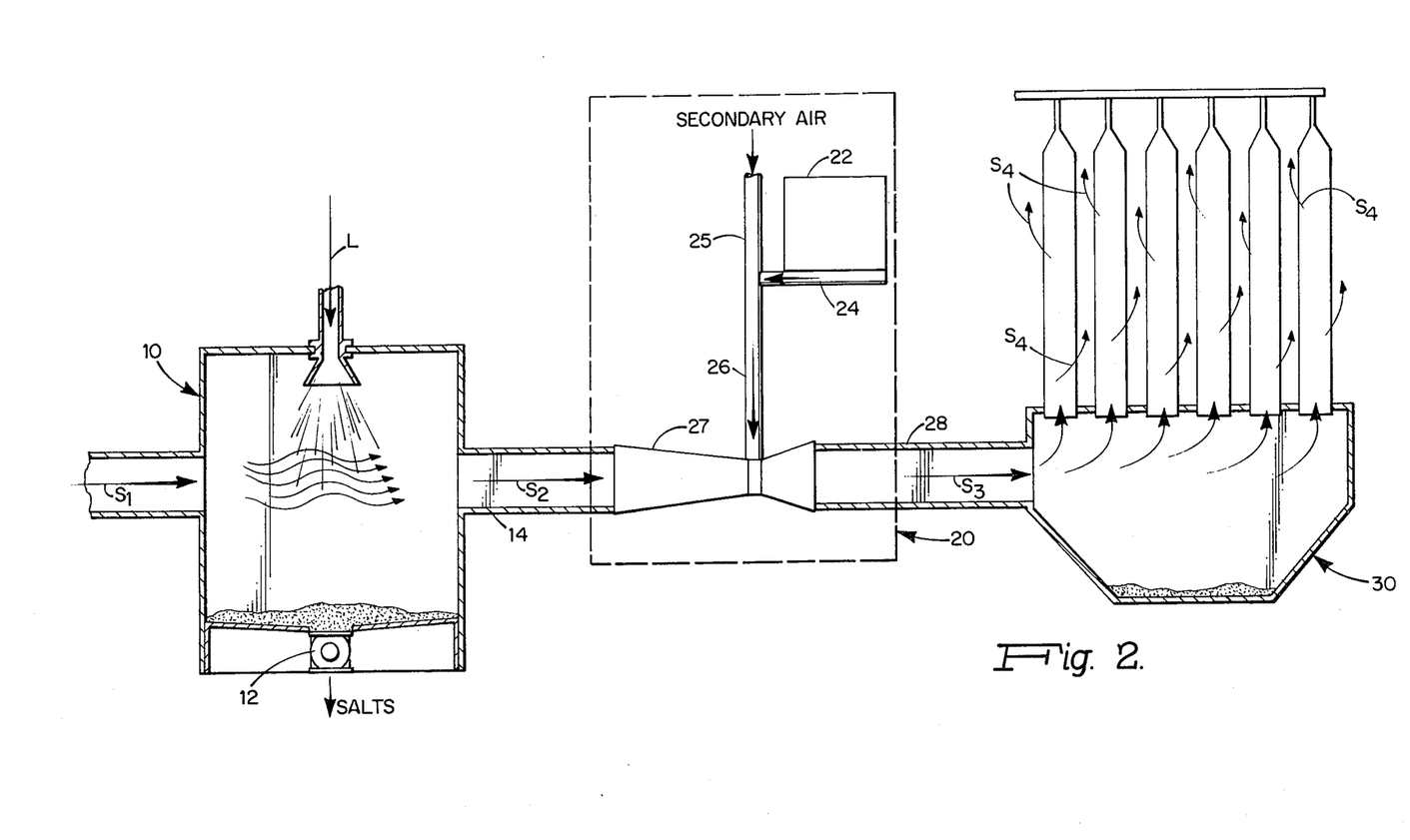
FIG. 2 is a flow diagram of an integrated treatment process employing a baghouse filter.

One means of accomplishing the aforegoing objectives is the use of a particulate material which is capable of sorbing the residual acid gases and moisture from the gas stream and some means for subsequently removing the particulate matter. Referring now to FIG. 2 which illustrates this mode of practicing the integrated process of the present invention, the exit stream $S_2$ from reaction chamber 10 is directed downstream via conduit 14 to a mixing area 20 (shown in dotted outline) where a particulate material capable of sorbing the residual acid gases is blown or otherwise introduced into the gas stream. Although described herein as an "area" for purposes of discussion, it is not necessary that this be a definable structure per se. The particulate material may be blown or otherwise introduced into the gas stream at one or more points along the conduit 14 downstream from reaction chamber 10 in an amount sufficient to sorb the residual acid gases. A preferred means of adding the particulate material is by gradually feeding it from a container 22 into a conduit 24 and mixing it with secondary air introduced via conduit 25 to suspend the particles. The mixed particle-air stream is then directed via conduit 26 into the throat of a venturi 27 installed in conduit 14.

Especiallly preferred sorptive materials for this process are nepheline syenite and phonolite. The use of nepheline syenite to sorb small residual amounts of acid gases from a high-volume effluent gas stream is described in more detail in U.S. Pat. Nos. 3,721,066 and 3,808,774, and these disclosures are incorporated herein by reference. The aforementioned U.S. Pat. No. 3,808,774 directed to the in situ water activation of nepheline syenite is especially relevant to the present invention.

In particular, U.S. Pat. No. 3,808,774 describes a process for the abatement of acid gas emissions on the order of 100–500 ppm. from a hot effluent gas stream by the steps of: 1) quenching the gas stream with water to cool and humidify it; 2) introducing to the gas stream particulate nepheline syenite having a particle size of about 5–20 microns to sorb both moisture and acid gases therefrom; and, 3) directing the gas stream bearing the nepheline syenite particles into a baghouse filter to remove the particulates together with the mositure and acid gases sorbed thereon.

As noted above, the gas stream $S_2$ leaving reaction chamber 10 is typically at a temperature of about 100°–250°F. and humidified; the residual acid gas content is on the order of 100–500 ppm. Thus, the gas stream is ideally suited for the practice of the aforementioned process. In accordance therewith, the humid gas stream is operative to wet the particulate nepheline syenite and thereby activate it to promote the selective sorption of acid gases. The activation and sorption occurs quite rapidly and is ideally completed by the time the gas stream and entrained nepheline syenite reach the means for separating the particulates. The rate of activation of nepheline syenite appears to be at least in part dependent on the relative humidity of the gas stream; and at a relative humidity of 20–30% or higher, the activation time is on the order of 1 milisecond. Although the activation time is reduced still further at higher relative humidities, ordinarily in the sorption process the amount of water introduced into the gas stream in chamber 10 is controlled so that the relative humidity of the stream $S_2$ does not exceed about 50%. The reason for this is that at higher relative humidities some clogging of the entrained particulates tends to occur along the flowpath and particularly in the baghouse filter. Once activated, particulate nepheline syenite sorbs acid gases from the gas stream in about 0.01–3.0 seconds.

This method of abating residual acid gas emissions has been shown to be about 95–99% effective as well as economical in removing acid gases present at concentrations of about 100–500 ppm. Because this sorption process is essentially a surface phenomenon, only a comparatively small portion of the total particulate material on the order of 7–15 wt.-% is actively used; and it is not economical to employ this process at higher concentrations of acid gases. The fact that only 7–15 wt.-% of the particulate material is available for sorption of acid gases must be taken into account in calculating the rate of addition of the particulate material necessary for approximately a stoichiometric equivalence based on the concentration of acid gases and flow rate of the gas stream. However, by first employing the quenching-reaction step which utilizes essentially all of the basic material to remove the bulk of the acid gases, the more selective and efficient sorption step becomes economical for cleaning up acid gas residuals. The overall effectiveness of the first stage, the reaction chamber-quenching process, and the second stage, the introduction of particulate nepheline syenite or similar material, in abating acid gas emissions is as high as 99.9%.

A preferred means of separating the gas stream from the particulate matter entrained therein is the use of a baghouse filter 30 as described in the aforementioned U.S. Pat. No. 3,808,774. The fact that residual acid gases and some moisture are removed from the gas stream due to sorption by the particulate material prior to reaching the baghouse filter means that corrosion of the filter is minimized. The reduction of moisture in the gas stream is also important in reducing fogging or misting conditions near the gas stream outlet. Moreover, the baghouse filter 30 removes not only the particulate nepheline syenite or similar material with moisture and acid gases sorbed thereon, but also removes the entrained salt particles from the first stage treatment and other particles which were initially present in the effluent gas. Therefore, on leaving the baghouse the exit stream $S_4$ generally will be ready for venting to the atmosphere.

As previously noted, the nepheline syenite, phonolite or similar material employed in the sorption step of this mode of practicing the integrated process may also be used as the basic material for the quenching-reaction step. The use of nepheline syenite, phonolite or similar natural ore as the basic material in the first stage as well as the sorptive material in the second stage of this process is particularly efficacious in the glass making industry. The salt by-product from the first stage and the particulate material with acid gases sorbed thereon collected in the baghouse may be combined and recycled directly into the glass-making furnaces. The high temperature in the furnaces promotes the decomposition of the ore-acid gas reaction product thereby regenerating the ore and the acid as raw materials for the glass-making operation.

EXAMPLE 3

To illustrate the combination of the reaction chamber-quenching process and the sorption process, an effluent gas stream from an incinerator was subjected to the integrated treatment of this embodiment of the present invention. The effluent gas stream $S_1$ contained about 12,200 ppm. HCl and about 2,170 ppm. $SO_2$ at a temperature of 2400°F. The gas stream was introduced to a reaction chamber where it was quenched with about a 3% aqueous slurry of a basic material consisting essentially of lime. Approximately 95% of the acid gases were removed from the gas stream in this manner. To the gas stream $S_2$ leaving the reaction chamber was added secondary air containing a suspension of finely divided nepheline syenite. After mixing, the gas stream $S_3$ containing the nepheline syenite was directed into a baghouse filter which separated the gas from the entrained particles. The gas stream $S_4$ leaving the baghouse was better than 99% free of acid gases based on the amounts present initially in gas stream $S_1$. These results are illustrated by Table 1 below.

Table 1

| Gas Stream No. | Gas Conditions | | | |
| --- | --- | --- | --- | --- |
|  | $S_1$ | $S_2$ | $S_3$ | $S_4$ |
| Volume (acfm.) | 246,600 | 115,108 | 132,925 | 132,925 |
| Temp. (dry bulb, °F.) | 2,400 | 247 | 220 | 220 |
| Dew Point (°F.) | 106 | 180 | 172.5 | 172.5 |
| Weight (lbs./hr. dry) | 189,517 | 189,517 | 264,377 | 264,377 |
| HCl (lbs./hr.) | 3,200 | 160 | — | 0.52 |
| (ppm.) | 12,200 | 281 | — | 2 |
| $SO_2$ (lbs./hr.) | 1,000 | 100 | — | 88 |
| (ppm.) | 2,170 | 100 | — | 85 |
| Particulates (gr./scf.) | — | — | — | <0.005 |

Reaction Chamber
Quench slurry:  231 gpm. at 70°F.
~3%-wt. aqueous slurry of lime
(3480 lbs. CaO/hr.)
Recovered solids:  4622 lbs. $CaCl_2$/hr.
1912 lbs. $CaSO_4$/hr.
361 lbs. CaO/hr.

Mixing Area
Particulate:  Nepheline syenite in air
~1500 lbs./hr. nepheline syenite
Secondary air:  16,944 acfm.; 74,860 lbs./hr. dry
dry bulb temp. = 70°F.; dew point = 60°F.

Baghouse Filter
Recovered solids:  ~2000 lbs./hr.

acfm. - actual cubic feet per minute
ppm. - parts per million (by volume)

Table 1-continued gpm. - gallons per minute
gr./scf. - grains per standard cubic foot

WET SCRUBBER PROCESS

FIG. 3 illustrates an alternative mode for carrying out an integrated process for abating acid gases from an effluent gas stream according to the present invention. In this mode a liquid crossflow scrubber is used to further treat the gas stream $S_2$ leaving reaction chamber 10. Such processes especially suitable for the present invention are described in U.S. Pat. No. 3,324,630 and co-pending U.S. Pat. application Ser. No. 463,652 entitled PROCESS FOR REMOVING PARTICULATES FROM A GAS filed of even date herewith by the same inventor, and those disclosures are incorporated herein by reference.

As noted above, the gas stream $S_2$ leaving reactor chamber 10 is typically at a temperature of about 150°–250°F. and partially humidified; and these conditions are ideally suited for the particulate "nucleation" process of the aforementioned processes. Nucleation is a term used to describe the process by which the effective size of very small particles is increased due to the combined effects of moisture condensation and inelastic collisions with other particles.

The gas stream $S_2$ passes via conduit 14 to the inlet venturi 101 of the scrubbing unit where it is further humidified by water quench 102 as it enters the venturi throat 103. A plug 104 having an essentially diamond-shaped cross-section may be inserted in the venturi throat and has been found to improve the efficiency of recovery. In particular, the use of a venturi with a diamond-shaped plug has been found to facilitate the removal of intermediate-sized particles of about 1–4 microns at this stage of the process. The removal of particles in the size range of 1–4 microns at this stage is believed to be the result of beginning nucleation, and such particles drop out of the gas stream either by action of gravity or by impinging on the diamond-shaped plug and being washed therefrom by the water spray. These particles are separated from the excess liquid introduced via the spray quench by suitable means such as filter screen 107 located under the venturi from which they are continuously or periodically removed. The excess liquid drains through filter screen 107 to collection chamber 108 for recirculation as hereinafter described.

The turbulent gas stream $S_5$, cooled but still at a temperature above 150°F. and moisturized to near saturation is next channeled through a set of baffles 105 which are continuously washed by a set of water jets 106. At this point nucleation occurs among particles below about 1 micron in size, and some of these are removed from the gas stream at this stage either by action of gravity or by impinging on the baffles and being washed therefrom by the water sprays. The wash water is drained to the bottom of the apparatus through filter screen 107 for effecting the separation of particles and liquid and into collection chamber 108. A pump 109 is used to recirculate the wash water, and the particles on filter screen 107 are continuously or periodically removed therefrom by suitable means.

Emerging from the baffle system, the turbulent gas stream $S_6$ is saturated with water vapor at a temperature of at least about 150°F. Nucleation of the particles is complete by the time the gas stream reaches the first scrubbing bed 111. The gas together with the entrained, nucleated particles is then passed in an essentially horizontal path through scrubbing bed 111 packed with a suitable packing material 112 where it is brought into crossflow contact with a scrubbing liquid, such as water, which is continuously sprayed into the scrubbing bed by water jets 113. Although FIG. 3 shows a scrubber having two scrubbing beds, 111 and 126, the number of beds and the size of the beds is not critical and may be varied to suit individual process requirements. For example, in the present description of the treatment of a gas stream containing both fluoride and sulfur oxide contaminants, two scrubbing beds 111 and 126 in series may be used to individually remove the acid gas contaminants in the manner hereinafter described. As shown, scrubbing bed 126 has associated with it water jets 124. A drainage zone 119 is provided between the two scrubbing beds to allow drippage of entrained liquid droplets from the gas stream $S_7$ leaving scrubbing bed 111 before entering scrubbing bed 126. The beds shown in FIG. 3 are inclined at an angle of about 15° from the vertical in the direction in which the gas is moving. Such a construction is not critical but helps to prevent "channeling" of the gas through the packing and thus insures thorough crossflow contact. The scrubbing liquids together with particulates are drained to the bottom of the two scrubbing beds through a support screen 114 which is of such a mesh size that the packing material 112 is supported while the particulates pass through and into collection and settling chambers 115 and 122 respectively which are so arranged as to permit an overflow from chamber 122 to chamber 115. Pumps 116 and 132 are used to recirculate the respective scrubbing liquids, and particulates are periodically or continuously removed from collection and settling chambers 115 and 122. In some applications, a single collection chamber may replace chambers 108, 115 and 122 and this single chamber may be served by one pump. A similar result is accomplished, as shown in FIG. 3 by arranging chambers 108, 115 and 122 so as to permit overflow.

Instead of water, the scrubbing liquids may comprise mildly alkaline solutions or slurries such as about a 0.05–10 wt.-% aqueous solution of sodium hydroxide or sodium carbonate or a lime slurry. The alkaline solutions and slurries are especially useful in removing residual acid gases. By employing two scrubbing beds in series, the first 111 washed with a mild alkaline solution such that the pH is maintained below about 6 as acid gases are absorbed and the second 126 washed with a stronger alkaline solution such that the pH of the second effluent liquid is between 6 and 13, hydrogen fluoride may be preferentially removed in the first scrubbing bed and sulfur dixoide in the second. Such a process is described in greater detail in co-pending U.S. Pat. application Ser. Nos. 243,147, filed Apr. 12, 1972, and now abandoned and 463653 entitled ABATEMENT AND SELECTIVE RECOVERY OF ACID GAS EMISSIONS which is now U.S. Pat. No. 3,919,392, filed of even date herewith by the same inventor, and those disclosures are incorporated herein by reference. Because some of the scrubbing liquid is invariably lost by vaporization or entrainment in the scrubbing beds, it is usually necessary to supplement the liquid recirculation system with feeds of make-up scrub- bing liquid 118 and 134 respectively. The treated outlet gas stream $S_8$ leaving the second scrubbing bed 126 is saturated at a temperature of about 150°F. or higher and is substantially free of particulate matter larger than about 0.10 microns.

Advantageously, after leaving scrubbing bed 126 the gas stream $S_8$ is passed through a second open drainage zone 128 to allow drippage of entrained liquid droplets followed by passage through a demisting chamber 130. The demisting chamber is packed with any suitable packing material, preferably the same material 112 used to pack the scrubbing beds, and acts to reduce the liquid content of the exit gas stream $S_9$ to minimize fogging at the outlet point.

It is often convenient, as shown in FIG. 3 to connect the recirculated water for the baffle wash system 106 and the venturi water quench 102. In place of water, both the venturi quench and the baffle wash may employ a mild alkaline solution as suggested above for the scrubbing liquids to reduce acid gas contaminants, and this is conveniently accomplished by employing a single collection and settling chamber as described above in place of chamber 108, 115 and 122 or arranging the chambers so as to permit overflow between them.

It will be apparent that the accumulation of soluble salts in the used quench liquid, baffle wash liquid, and scrubbing liquids necessitates drawing-off a portion of these recycle streams either continuously or periodically and replacing the same with fresh make-up liquid. The effluent liquids from scrubbing beds 111 and 126, the venturi, and the baffles will typically be at a temperature of about 100°F. or higher and contain dissolved therein the salt fines which were carried from reaction chamber 10 as well as the salts formed by reaction of the basic material in the scrubbing liquids and the residual acid gases. The use of wet scrubbers to remove soluble particulates has heretofore been severly curtailed by the problem of how to dispose of this hot, contaminated scrubbing liquid. Environmental regulations concerning disposal of soluble salts are especially stringent, and there is no economically feasible application for such dilute brine solutions.

This problem is now eliminated by the expedient of recycling the drawn-off portion of the used scrubbing liquid for use as the carrier liquid for the basic material in the first stage of this process. The used venturi quench liquid, baffle wash liquid, and scrubbing liquid after separation from any solids are pumped by pump 109 to conduit 44 and into mixing chamber 40 where it is mixed with either the proper amount of dry basic material or with a concentrated solution or slurry of the basic material B in such proportions as to yield the desired final concentration of basic material in the basic-salt solution for feeding to the reacction chamber. A bleed-off line 50 and valve 52 may also be provided to divert some of the used scrubbing liquid if the quantity should ever become greater than that amount of liquid capable of being vaporized in the reaction chamber. This procedure of recycling one portion of effluent scrubbing liquid to the scrubbing beds and a second portion to the reaction chamber can be used to concentrate the amount of dissolved salts in the effluent scrubber liquid to any desired level. In effect this procedure recycles the fine salt particles originally carried from the reaction chamber by the gas stream as supplemented by additional salt formed in neutralizing residual acid gases thus increasing the amount of the salt recovered in a dry, commercially-desirable state. It also eliminates the problem of disposing of the used scrubbing liquid. Thus, the exit gas stream $S_9$, like exit gas stream $S_4$ in FIG. 2 of the previously-described alternative process, is essentially free of acid gases and particulates and is ready for exhausting to the atmosphere.

EXAMPLE 4

To illustrate the combination of the reaction chamber-quenching process and the scrubbing process, an effluent gas stream from an incinerator was subjected to the integrated treatment of this embodiment of the present invention. The effluent gas stream $S_1$ contained about 12,200 ppm. HCl and about 2,170ppm. $SO_2$ at a temperature of 2400°F. The gas stream was introduced to a reaction chamber where it was quenched with about a 2.18 wt.-% aqueous slurry of lime (CaO). Approximately 95% of the hydrogen chloride was removed from the gas stream in this manner. On the other hand, only about 10% of the sulfur dioxide was removed from the gas stream at this stage. This is because the rate of addition of lime of the reaction chamber was intentionally limited to about 110% of the amount required for stoichiometric equivalence based on the rate of addition of hydrogen chloride. Due to the greater solubility of hydrogen chloride in water and a reaction driving force for hydrogen chloride about six times greater than that for sulfur dioxide based on their relative concentrations in the gas stream, the removal of sulfur dioxide from the gas stream at this stage is thereby minimized while having little effect on the efficiency of removal of hydrogen chloride. In this manner it was possible to obtain a calcium chloride by-product from the reaction chamber which was about 90% pure with minimum contamination by calcium sulfate. Such a procedure is economically feasible because the concentration of $SO_2$ in the incinerator gas is sufficiently low that reliance may be placed solely on the second stage scrubbing process for its removal.

The gas stream $S_2$ leaving the reactor chamber was then directed into a crossflow scrubber unit where it was further humidifiied to saturation conditions and sufficient turbulence was induced to promote particulate nucleation prior to reaching the scrubbing beds. The scrubbing beds consisted of two beds designed to separately recover residual HCl and $SO_2$. The first bed was washed with a scrubbing liquid which was about a 0.08% aqueous slurry of $Ca(OH)_2$ such that the effluent scrubbing liquid had a pH not greater than about 6. By maintaining a low pH of about 6, only HCl was removed from the gas stream in the first scrubbing bed. The gas stream was then passed into the second scrubbing bed which was washed with about a 3% aqueous solution of NaOH such that the used scrubbing liquid had a pH of greater than 6, preferably about 8–10. By maintaining a higher pH in the second scrubbing bed virtually all of the $SO_2$ was removed from the gas stream. The gas stream $S_8$ leaving the second scrubbing bed was passed through a drainage zone and a demister. The gas stream $S_9$ leaving the drainage zone was better than 99% free of acid gases, based on the amounts present initially in gas stream $S_1$.

The effluent scrubbing liquid from the first scrubbing bed containing $Ca(OH)_2$ and $CaCl_2$ was partially recycled to the mixing chamber where additional lime was added and it was used as the basic slurry for quenching gas stream $S_1$, while the remaining portion was supplemented with additional lime and recycled to the first scrubbing bed. The effluent scrubbing liquid from the second scrubbing bed containing NaOH and $Na_2SO_3$ was mixed with lime to precipitate $CaSO_3$ and recover a caustic solution for recycle to the second scrubbing bed.

These results are illustrated by Table 2 below.

TABLE 2

| Gas Stream No. | Gas Conditions | | |
|---|---|---|---|
| | $S_1$ | $S_2$ | $S_8$ |
| Volume (acfm.) | 246,600 | 115,108 | 106,890 |
| Temp. (dry bulb, °F.) | 2,400 | 247 | 181 |
| Dew Point (°F.) | 106 | 180 | 181 |
| Weight (lbs./hr. dry) | 189,517 | 189,517 | 189,517 |
| HCl (lbs./hr.) | 3,200 | 160 | 1 |
| (ppm.) | 12,200 | 610 | 2 |
| $SO_2$ (lbs./hr.) | 1,000 | ~900 | 88 |
| (ppm.) | 2,170 | ~1,167 | 100 |
| Particulates (gr./scf.) | — | — | 0.01 |

| | Reaction Chamber |
|---|---|
| Quench slurry: | 230 gpm. |
| | ~2.18% aqueous slurry of lime (CaO) |
| Recovered salts: | 4622 lbs. $CaCl_2$/hr. |
| | ~191 lbs. $CaSO_4$/hr. |
| | ~240 lbs. CaO/hr. |
| | Mixing Chamber |
| Recycled scrubbing liquid: | 230 gpm. containing 72 lbs. CaO/hr. |
| Additional lime (CaO): | 2500 lbs./hr. |
| | Scrubbing Beds |
| 1st scrubbing bed: | 1000 gpm. |
| | 0.08% aqueous slurry of CaO |
| 2nd scrubbing bed: | 2600 gpm. |
| | 3% aqueous solution of NaOH | acfm. - actual cubic feet per minute
ppm. - parts per million (by volume)
gpm. - gallons per minute
gr./scf. - grains per standard cubic foot The relative costs of the alternative treatment processes for the gas stream following the reaction chamber are comparable, and selection between the two processes will generally depend upon other factors peculiar to each application of the present invention. In some instances a combination of the sorption process and the scrubbing process may be called for. The integrated process of the present invention is seen to be flexible and readily adaptable to any industrial operation which produces large volumes of effluent gas containing acid gas constituents. Depending on the nature of the acid gases, the basic material for the reaction-quenching stage can be selected with a view toward forming a particular salt by-product for sale or for regeneration of the basic material for recycling. Mixtures of two or more basic materials may also be employed in the first stage to abate a mixture of acid gases in a single effluent gas stream. The basic material for the first stage may be the same as the particulate material used in the second stage sorption process. Similarly, the basic material for the first stage may be the same as or different than the basic material comprising the scrubbing liquor in the alternative second stage scrubbing process. Other variations and modifications of the basic processes described herein and of the apparatus for carrying out such processes will be obvious to those skilled in the art and all such processes and apparatus are contemplated as being within the scope of the present invention.

The reaction chamber-quenching step for large-scale abatement of acid gases is itself a great improvement over prior art processes. Foremost in this regard is the fact that no prior art process results in a dry, ready-to-package salt. Instead of leaving a messy and hard-to-dispose-of brine solution the process of this invention results in a commercially valuable by-product. Furthermore, the prior art processes are not adaptable to handling large volumes of hot effluent gases. The counter-current liquid scrubbing towers of the prior art result in high pressure drops and correspondingly require large amounts of energy for operation. Also, if the gas stream to be treated is not pre-cooled to less than the boiling point of the liquid, there is evaporation and inefficient operation. The reaction-quenching step of the present invention avoids all of these difficulties of practicing the prior art processes.

Moreover, a two-way synergistic cooperation is seen to exist between the reaction-quenching step and subsequent treatment processes for removing particulates and residual acid gases which is not possible with the prior art processes. Not only does the reaction-quenching step remove the bulk of acid gas contaminants, it also renders the gas stream ideally suited for further treatment by either the sorption or the scrubbing process described herein. In addition, the waste liquor from the scrubbing process is ideal for use as the carrier for the basic material in the reaction-quenching step since it supplies unused basic material, some heat and additional salt by-product.

Having described and illustrated the present invention, what I claim is:

1. A process for treating effluent gases having a temperature above about 350°F. and initially containing high concentrations of sulfur oxides, nitrogen oxides, hydrogen halides, silicon tetrafluoride and mixtures thereof to reduce the concentrations of these acid gases to environmentally required levels, comprising the following steps:
   1. First treating the effluent gases to remove a predominant portion of the acid gases by the steps of:
      a. spraying into said effluent gases an aqueous solution or slurry of a basic material selected from the group consisting of: the oxides, hydroxides, carbonates and bicarbonates of the alkali metals, alkaline earth metals, zinc, nickel, copper and iron; nepheline syenite and phonolite; and mixtures thereof;
      b. adjusting the concentration of basic material in said solution or slurry and the rate of addition of solution or slurry such that 60–95% of the acid gases initially present react with said basic material for form a solid salt reaction product and the hot effluent gases rapidly evaporate substantially all of the liquid water thereby cooling the effluent gases to a temperature below about 250°F. and humidifying the gases to a relative humidity of about 20–50%; and,
      c. separating the larger solid salt particles from the effluent gases by gravity; and,
   2. Thereafter further treating the effluent gases for the removal of residual acid gases and solid particles by the steps of:
      a. contacting the effluent gases with a particulate sorbent material selected from nepheline syenite, phonolite and mixtures thereof to sorb residual acid gases to environmentally acceptable levels; and, b. separating the mixture of effluent gases and particulate material by filter means.

2. The process of claim 1 wherein the heat necessary to vaporize all of the water and leave a dry salt reaction product is provided by the effluent gas stream.

3. The process of claim 1 wherein at least a part of the heat necessary to vaporize all of the water and leave a dry salt reaction product is provided by the aqueous slurry which has been superheated.

4. The process of claim 1 wherein said gas stream is quenched with an aqueous slurry of an essentially water-insoluble basic compound selected from the group consisting of: $Ca(OH)_2$, $CaO$, $CaCO_3$, $Mg(OH)_2$, $MgO$, $MgCO_3$, $Fe(OH)_3$, $FeCO_3$, $Fe_2(CO_3)_3$, $FeO$, $Fe_2O_3$, $Ni(OH)_2$, $NiO$, $NiCO_3$, $BaCO_3$, $Ba(OH)_2$, $BaO$, $Zn(OH)_2$, $ZnO$, $ZnCO_3$, $Cu(OH)_2$, $CuOH$, and mixtures thereof.

5. The process of claim 4 wherein said acid gases consist essentially of hydrogen halides, said aqueous slurry is a slurry of alkaline earth metal oxide or hydroxide, and said recovered salt is an alkaline earth metal halide suitable for deicing purposes.

6. The process of claim 5 wherein said hydrogen halide is hydrogen chloride, said alkaline earth metal oxide or hydroxide is lime, and said recovered salt is calcium chloride.

7. The process of claim 1 wherein said basic material is magnesium oxide or magnesium carbonate, said acid gases comprise sulfur dioxide and said dry salt is magnesium sulfite.

8. The process of claim 7 wherein said magnesium sulfite is heated to above its decomposition temperature to regenerate magnesium oxide and sulfur dioxide, said sulfur dioxide being recovered and said magnesium oxide being recycled as said basic compound.

9. The process of claim 1 wherein the basic material used in said aqueous solution or slurry is the same as said particulate sorbent material.

10. The process of claim 1 wherein said gas stream is quenched with an aqueous solution of a water-soluble basic compound selected from the group consisting of $NaOH$, $Na_2CO_3$, $NaHCO_3$, $Na_2SO_3$, $KOH$, $K_2CO_3$, $KHCO_3$, $K_2SO_3$, $KiOH$, $Li_2CO_3$, $LiHCO_3$, and mixtures thereof.

11. A process for treating effluent gases having a temperature above about 350°F. and initially containing high concentrations of sulfur oxides, nitrogen oxides, hydrogen halides, silicon tetrafluoride and mixtures thereof to reduce the concentrations of these acid gases to environmentally required levels, comprising the following steps:

1. First treating the effluent gases to remove a predominant portion of the acid gases by the steps of:
   a. spraying into said effluent gases an aqueous solution or slurry of a basic material selected from the group consisting of: the oxides, hydroxides, carbonates and bicarbonates of the alkali metals, alkaline earth metals, zinc, nickel, copper and iron; nepheline syenite and phonolite; and mixtures thereof;
   b. adjusting the concentration of basic material in said solution or slurry and the rate of addition of solution such that 60–95% of the acid gases initially present react with said basic material for form a solid salt reaction product and the hot effluent gases rapidly evaporate substantially all of the liquid water thereby cooling the effluent gases to a temperature above about 150°F. to about 212°F. and humidifying the gases substantially to saturation; and,
   c. seaparating the larger solid salt particles from the effluent gases by gravity;

2. Initiating nucleation of the residual particulates in the effluent gases by treating the gases, at a temperature above about 150°F. to about 212°F. and humidified substantially to saturation, in an intermediate enclosure to increase turbulence in the gases; and 3. Thereafter further treating the effluent gases for the removal of residual acid gases and particles by the steps of:
   a. passing said effluent gases which are at a temperature above about 150°F. to about 212°F. and substantially saturated in a substantially horizontal path through an enclosure containing packing;
   b. passing an aqueous scrubbing liquid downwardly over said packing;
   c. exhausting said effluent gases from said enclosure containing packing substantially free of residual acid gases and solid particles; and,
   d. collecting said scrubbing liquid after passage through said packing and recirculating said liquid to said packing while maintaining it at a substantially constant temperature approximately the same as the saturated gases which is above about 150°F. to about 212°F.

12. The process of claim 11 additionally comprising the step of treating said effluent gases essentially free of acid gases and particulates to remove moisture therefrom.

13. The process of claim 12 wherein said treatment to remove moisture comprises the steps of:
   a. passing said effluent gases essentially free of acid gases and particulates through a drainage zone to permit the drainage of larger entrained water droplets; and,
   b. thereafter passing said effluent gases in a horizontal path through an enclosure filled with a packing material to remove smaller droplets; and,
   c. exhausting said effluent gases essentially free of water droplets.

14. The process of claim 11 wherein said aqueous scrubbing liquid which is passed over said packing is an alkaline solution or slurry.

15. The process of claim 14 wherein said alkaline solution or slurry is a suspension of lime.

16. The process of claim 14 additionally comprising the steps of:
   a. filtering said aqueous scrubbing liquid collected after passage through said packing to remove entrained solids; and,
   b. recycling said liquid and the salts dissolved therein for use as at least a portion of the aqueous solution or slurry used in initially quenching said effluent gases.

* * * * *